US009280905B2

(12) United States Patent
Campiranon et al.

(10) Patent No.: US 9,280,905 B2
(45) Date of Patent: Mar. 8, 2016

(54) MEDIA OUTLINE

(75) Inventors: Chatree Campiranon, Mountain View, CA (US); Joshua John Forman, San Francisco, CA (US); Aaron Eliezer Golden, San Francisco, CA (US); Aaron Haney, San Francisco, CA (US); Andrew C. Hoyer, San Francisco, CA (US); Scott William Kyle, El Dorado Hills, CA (US); Marie Dalby Szuts, El Cerrito, CA (US)

(73) Assignee: Inkling Systems, Inc., San Francisco, CA (US)

( * ) Notice: Subject to any disclaimer, the term of this patent is extended or adjusted under 35 U.S.C. 154(b) by 825 days.

(21) Appl. No.: 13/323,792

(22) Filed: Dec. 12, 2011

(65) Prior Publication Data

US 2013/0150990 A1   Jun. 13, 2013

(51) Int. Cl.
   G06F 17/00   (2006.01)
   G09B 5/06   (2006.01)
   G06F 17/30   (2006.01)

(52) U.S. Cl.
   CPC ............ *G09B 5/06* (2013.01); *G06F 17/30056* (2013.01); *G06F 17/30743* (2013.01)

(58) Field of Classification Search
   CPC ....... G06F 17/00; G06F 3/048; G06F 3/0481; G06F 17/30056; G06F 17/30743; G11B 27/34; G11B 27/034; G11B 20/10
   USPC .......................................................... 700/94
   See application file for complete search history.

(56) References Cited

U.S. PATENT DOCUMENTS

| 7,913,157 | B1 * | 3/2011 | Stoakley et al. | 715/203 |
| 8,065,604 | B2 * | 11/2011 | Blankinship | 715/229 |
| 2002/0037153 | A1 * | 3/2002 | Slone | 386/52 |
| 2002/0057287 | A1 * | 5/2002 | Crow et al. | 345/716 |
| 2003/0080991 | A1 * | 5/2003 | Crow et al. | 345/716 |
| 2003/0128227 | A1 * | 7/2003 | Crow et al. | 345/700 |
| 2003/0146927 | A1 * | 8/2003 | Crow et al. | 345/716 |
| 2004/0044532 | A1 * | 3/2004 | Karstens | 704/271 |
| 2004/0220926 | A1 * | 11/2004 | Lamkin et al. | 707/3 |
| 2004/0234250 | A1 * | 11/2004 | Cote et al. | 386/96 |
| 2004/0266337 | A1 * | 12/2004 | Radcliffe et al. | 455/3.06 |
| 2006/0149781 | A1 * | 7/2006 | Blankinship | 707/103 R |
| 2006/0204213 | A1 * | 9/2006 | Slone | 386/52 |
| 2007/0011614 | A1 * | 1/2007 | Crow et al. | 715/723 |
| 2007/0013609 | A1 * | 1/2007 | Crow et al. | 345/1.1 |
| 2008/0065693 | A1 * | 3/2008 | Malik | 707/104.1 |
| 2008/0072152 | A1 * | 3/2008 | Crow et al. | 715/716 |
| 2008/0235566 | A1 * | 9/2008 | Carlson et al. | 715/205 |
| 2009/0170425 | A1 * | 7/2009 | Matsumoto | 455/3.06 |
| 2010/0142930 | A1 * | 6/2010 | Tanaka et al. | 386/126 |
| 2010/0220197 | A1 * | 9/2010 | Dukellis et al. | 348/207.1 |
| 2010/0223128 | A1 * | 9/2010 | Dukellis et al. | 705/14.51 |
| 2011/0026898 | A1 * | 2/2011 | Lussier et al. | 386/280 |
| 2011/0040804 | A1 * | 2/2011 | Peirce et al. | 707/803 |
| 2011/0125784 | A1 * | 5/2011 | Cocheu et al. | 707/769 |
| 2011/0125870 | A1 * | 5/2011 | Matsumoto | 709/217 |

(Continued)

*Primary Examiner* — Xu Mei

(74) *Attorney, Agent, or Firm* — Ascenda Law Group, PC

(57) ABSTRACT

Disclosed is a method for presenting an interactive media presentation, the method including presenting media section descriptions with a selectable time code and a description; presenting a media controller and including a displayed time line with one or more selectable time points; upon playing a media item, advancing a time indicator along the time line in accordance with a playback position of the media item and featuring the media section description corresponding to the playback position in the media item.

14 Claims, 11 Drawing Sheets

(56) References Cited

U.S. PATENT DOCUMENTS

| | | |
|---|---|---|
| 2011/0126103 A1* | 5/2011 | Cohen et al. .................. 715/716 |
| 2011/0200116 A1* | 8/2011 | Bloch et al. .............. 375/240.25 |
| 2012/0030550 A1* | 2/2012 | Chin et al. .................... 715/202 |
| 2013/0014190 A1* | 1/2013 | Sansom et al. ................ 725/109 |
| 2013/0091563 A1* | 4/2013 | Buchanan ....................... 726/17 |
| 2014/0068746 A1* | 3/2014 | Gonzalez Martinez et al. .. 726/9 |

\* cited by examiner

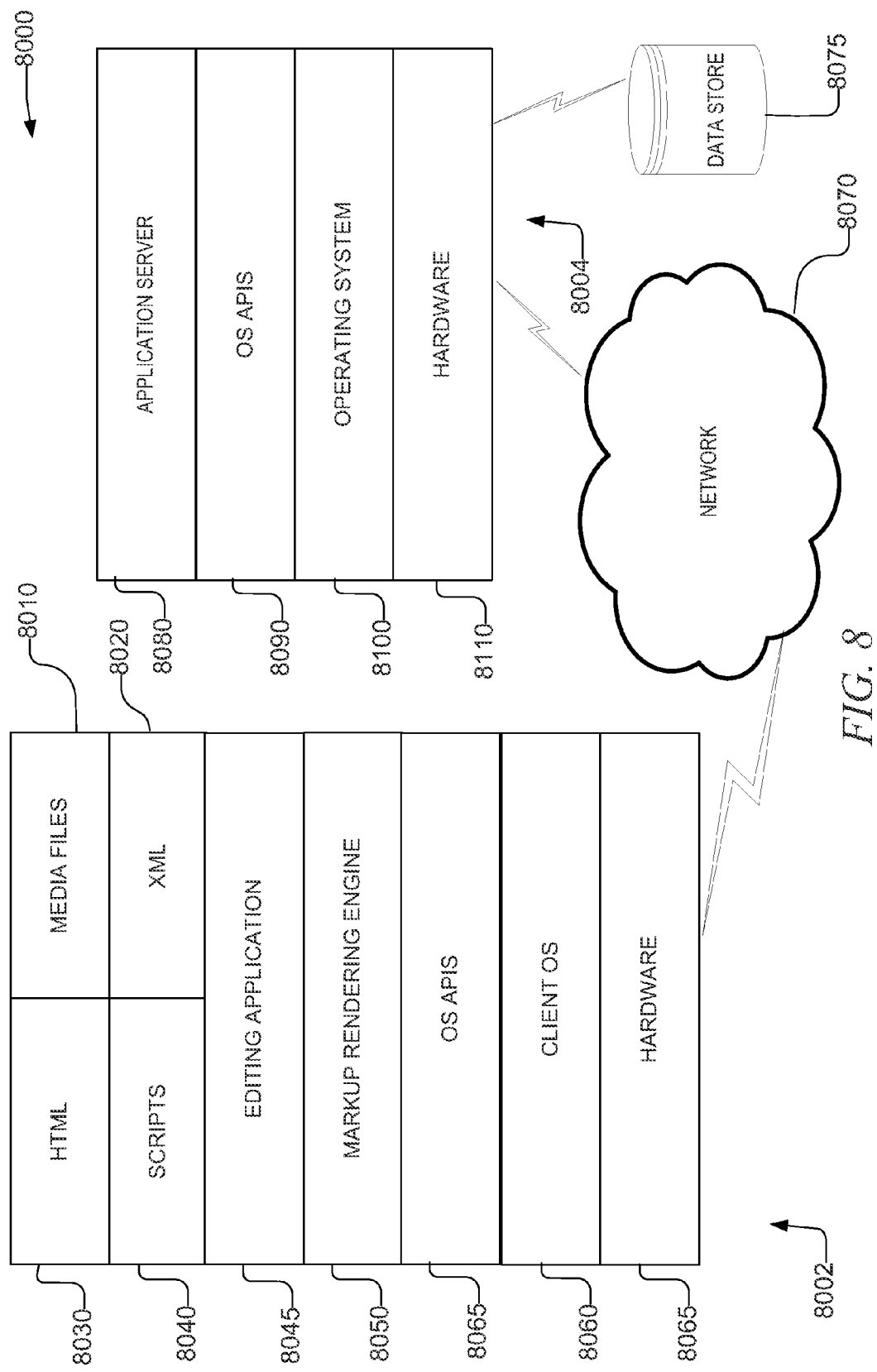

US 9,280,905 B2

MEDIA OUTLINE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc., All Rights Reserved.

BACKGROUND

Teaching students about audio, visual, or audio-visual media (as may be done in film or music classes) may be challenging as traditional textbooks are not adapted to drawing a student's attention to certain aspects of the media in an efficient and contextual manner. Traditional textbooks typically provide a description of the media that is unconnected to the media itself. This approach relies on the student to infer the associations between the description and the media and to access such content in the appropriate sequence and context.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 8 shows a system for creating media outlines according to some examples of the present disclosure.

DETAILED DESCRIPTION

Disclosed in some examples are systems, methods, and machine-readable media that provide for a media outline that guides users through a media presentation and various points of interest in that media presentation. The media outline features descriptions of particular sections of the media as the particular section of that media is being played back. These media section descriptions present notes, commentary, or supplemental information that may relate to the particular media section that is currently playing. The media and the particular media section descriptions may be linked such that advancing the playback of the media to a particular playback time features the media section description for the particular section of media corresponding to that particular playback time. Similarly, users may select any of the different media section descriptions and doing so may advance the media playback to the beginning of the associated section in the media.

Figure 1:
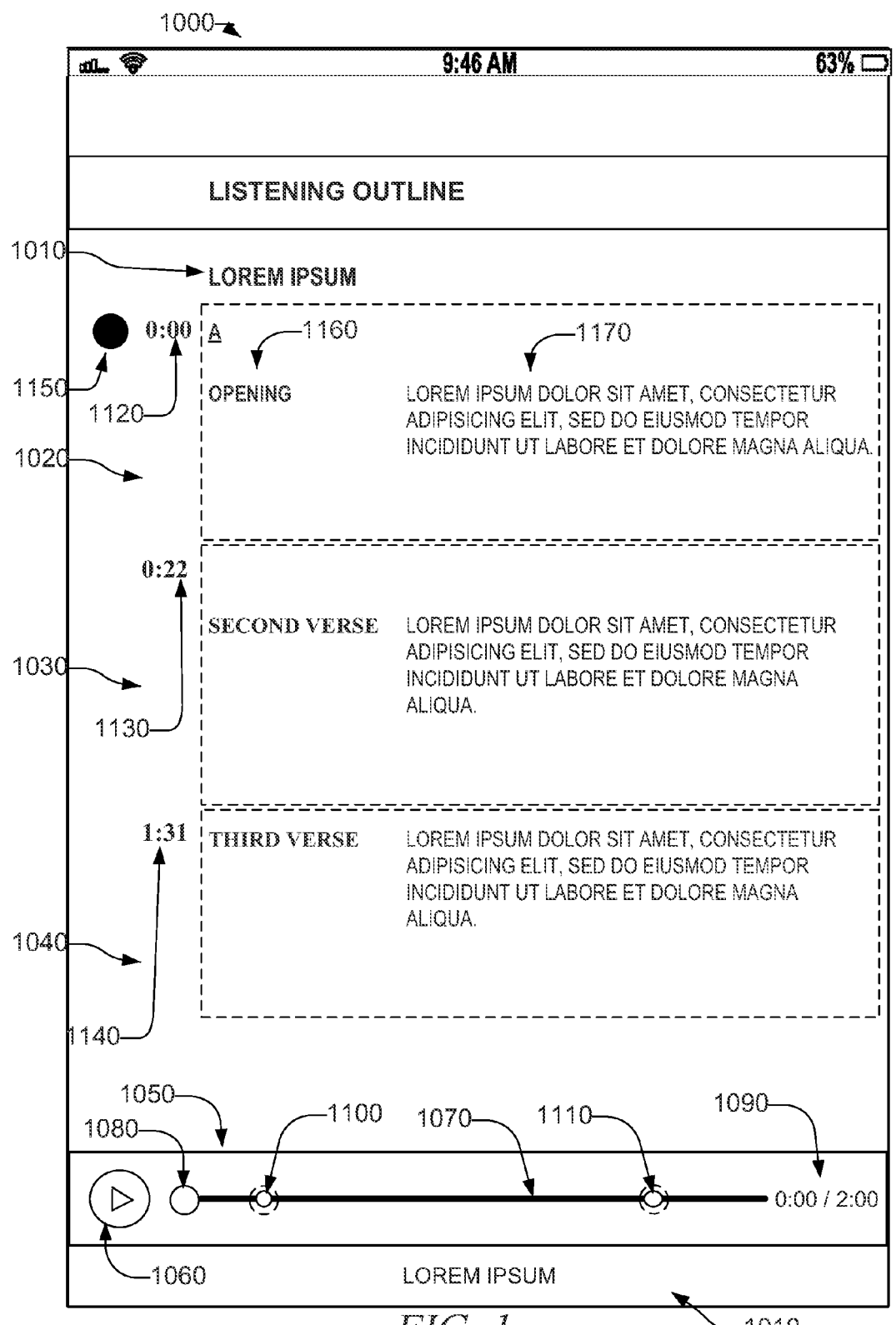
FIG. 1 shows a media outline according to some examples of the present disclosure.

Turning now to FIG. 1, a type of media outline, a listening outline 1000, is shown. The title of the work, "LOREM IPSUM" is displayed at 1010. In some examples, for purposes of the media outline, the media may be subdivided into a plurality of media sections. Each media section may have a time code that indicates the position within the media at which the section begins. Each media section may also have a media section description that describes the media during that section. The media of FIG. 1 is divided into three sections and the three corresponding media section descriptions 1020, 1030, and 1040 are shown enclosed by dotted boxes for clarity purposes (e.g., the dotted boxes may not be displayed). Time codes 1120, 1130, and 1140 indicate the beginning playback position of the associated media sections that correspond to the respective media section descriptions 1020, 1030, and 1040.

Media controller 1050 is shown with a control button 1060 for initiating various media playback functionality (e.g., play/pause/rewind/fast-forward or the like), a time line 1070, and a time indicator 1080 which slides along the time line 1070 as a visual indication of the playback position of the media file. The position of the time indicator 1080 along time line 1070 serves as a visual indication of the playback position of the media relative to the entire length of the media as expressed by the position of the time indicator 1080 relative to the length of the time line 1070. Thus, for example, when the time indicator 1080 is halfway between the start and end of the time line 1070, the playback position of the media is halfway between the beginning and the end of the media.

Media controller 1050 may also display a current playback position expressed as a time elapsed and a total time as shown at 1090. Time indicator 1080 may be slidable by a user across time line 1070 to advance (or to rewind) the playback position of the media.

Media controller 1050 may also display a number of selectable time points, such as selectable time points 1100 and 1110 which are selectable points along time line 1070 which correspond to the various time codes 1120, 1130, and 1140. Similar to the position of the time indicator 1080, time points 1100 and 1110 are positioned on the time line 1070 as a visual indication of the playback position of the beginning of the media sections relative to the entire length of the media as expressed by the position of time points 1100 and 1110 relative to the length of the time line 1070. Thus a time point which is exactly halfway through the media will be placed halfway between the beginning and the ending of the time line 1070. Note that the time point that corresponds to time code 1120 is hidden by time indicator 1080. Selecting one of the time codes 1120, 1130, or 1140, or one of the time points 1100, 1110 (or the time point hidden by time indicator 1080) changes the playback position of the media file to the particular time indicated by the time code and the time indicator to the associated time point, and the corresponding media description may be featured to indicate that it is currently being played. For example, selecting time code 1130 ("0:22") or the associated media section description 1030 may advance the media playback to 22 seconds, advance the time indicator 1080 to time point 1100, and feature media section description 1030. Selecting one of time points 1100 and 1110 may also cause the media to advance to the corresponding time and feature the appropriate media description. For example, selecting time point 1110 may cause the media playback to advance to 1:31, the time indicator 1080 to advance to time point 1110, and cause the media section description 1040 to be featured.

The appropriate media description is also featured as the media is played when the playback position advances past the start of a media description time code (1120, 1130, and 1140). Thus for example, in the listening outline of FIG. 1, media section description 1020 has a time code of 0:00 and will be featured first. If a user were to tap the control button 1060 to begin playing the media, the time indicator 1080 would begin advancing along the time line 1070 as the media is played. Once the media gets to an elapsed time of zero minutes 22 seconds (corresponding to the time code 1130 and the time point 1100), the media section description 1030 will be featured. As the media file continues playing and finally reaches a time elapsed of 1:31 (and consequentially the time indicator 1080 reaches time point 1110), the media section description 1040 will be featured. The order of the media section descriptions may be based upon an order of the media sections which may be based upon the time codes, and the duration of the media section described by a media section description defined by the difference between the time code of the current media section description and the time code of the next media section description.

Featuring a media section description 1020, 1030, or 1040 may include repositioning it in a prominent portion of the screen such as the middle, an upper third, or the like. Featuring may also include changing font size, font color, font style, font type, and highlighting the text within the media section. In other examples, the time codes 1120, 1130, and 1140 may also be featured. Additionally, featuring a media section description may also include placing a time code button 1150 next to the currently featured media section description.

In some examples, featuring a media section description may include displaying a previously un-displayed media section description. For example, if the media is video, the media section description may be displayed overlaid on the video only when the media section it describes is currently playing. In addition, in some examples, there may be too many media section descriptions to properly fit on the screen at one time, so the media section descriptions may be scrollable, and featuring the media section description may include automatically scrolling the media section description so as to be visible.

A media section description may include one or more descriptions of the contents of a portion of the media and may include text, graphics, video, and/or audio. In FIG. 1, the media section description includes a description of what is happening in the media portion at 160 (e.g., "OPENING", "SECOND VERSE," and "THIRD VERSE") and the lyrics of the media portion. Other media descriptions may include lyrics in multiple languages such as a first language (e.g., Latin) and a second language (e.g., English), musical staff notation, guitar tablature, chord diagrams, or the like. In examples in which musical notation is displayed, the individual musical notes may be highlighted as they are played. In still other examples, the media section description may include other media. For example, a listening outline such as the one shown in FIG. 1 may have media section descriptions which consist of a series of videos of the various performers playing the section of media. Thus for example, a particular media section may be a flute solo and the description may be a video of the performance of the flute solo. The next section may feature the cello section prominently and the video may show the cello performance. These videos may be featured by centering them on the screen and automatically beginning playback of the video.

While FIG. 1 shows a media outline for audio, one skilled in the art with the benefit of the present disclosure will appreciate that video and audio-video may also be used. In examples in which video is displayed, the video may be displayed separately from the plurality of media descriptions. For example, the video may be displayed in a box below the media section descriptions. In other examples, the media section descriptions may be overlaid on top of the video as the video is played. In these examples, the media section descriptions may have temporal and spatial components that may specify when the description is displayed, and where on the video it is displayed.

Figure 2:
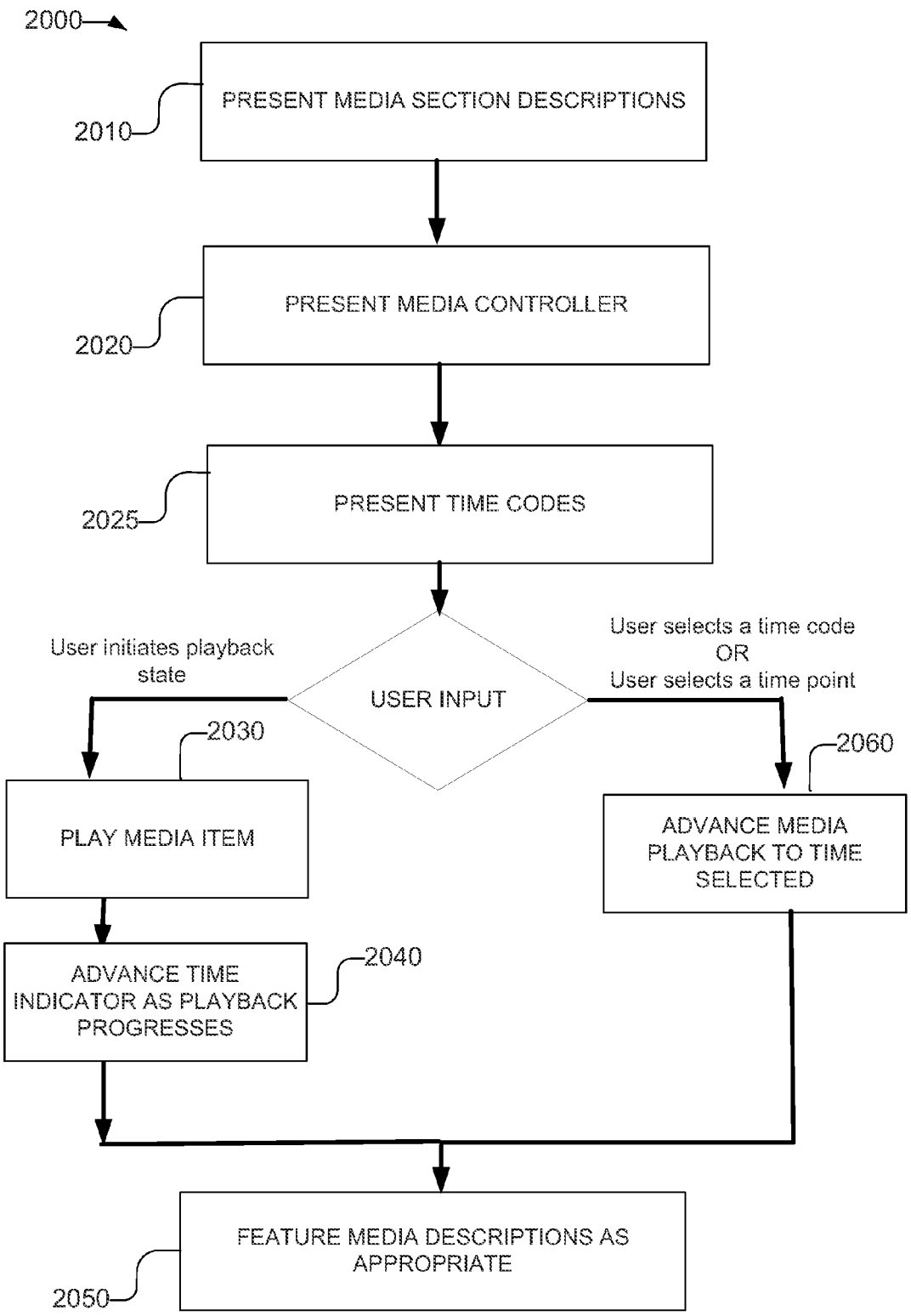
FIG. 2 shows a flowchart of a method of presenting a media outline according to some examples of the present disclosure.

Turning now to FIG. 2, a high-level description of a method 2000 for displaying a media outline is shown. At operation 2010, a plurality of media section descriptions are presented to a user. At operation 2020, a media controller is presented to the user. At operation 2025, time codes indicating the beginning playback position of the various media sections may be presented next to the media section description. In some examples, there may be more media section descriptions than can fit on a single screen, in which case the user may scroll to see the remaining presented media section descriptions, or the user may simply play the media and the media descriptions may automatically scroll as a result of playback of the media. If a user initiates a playback state (e.g., by pressing the play button), playback of the media may begin at operation 2030. The time indicator may then be advanced as the playback progresses at operation 2040. As the playback position advances to a new media section, the appropriate media section description may be featured at operation 2050. If the user selects a time code or selects a time point, then the media may be advanced to that playback time at operation 2060 and the new media section description may be featured if the playback time changed the playback of the media to a new media section at operation 2050.

Figure 3:
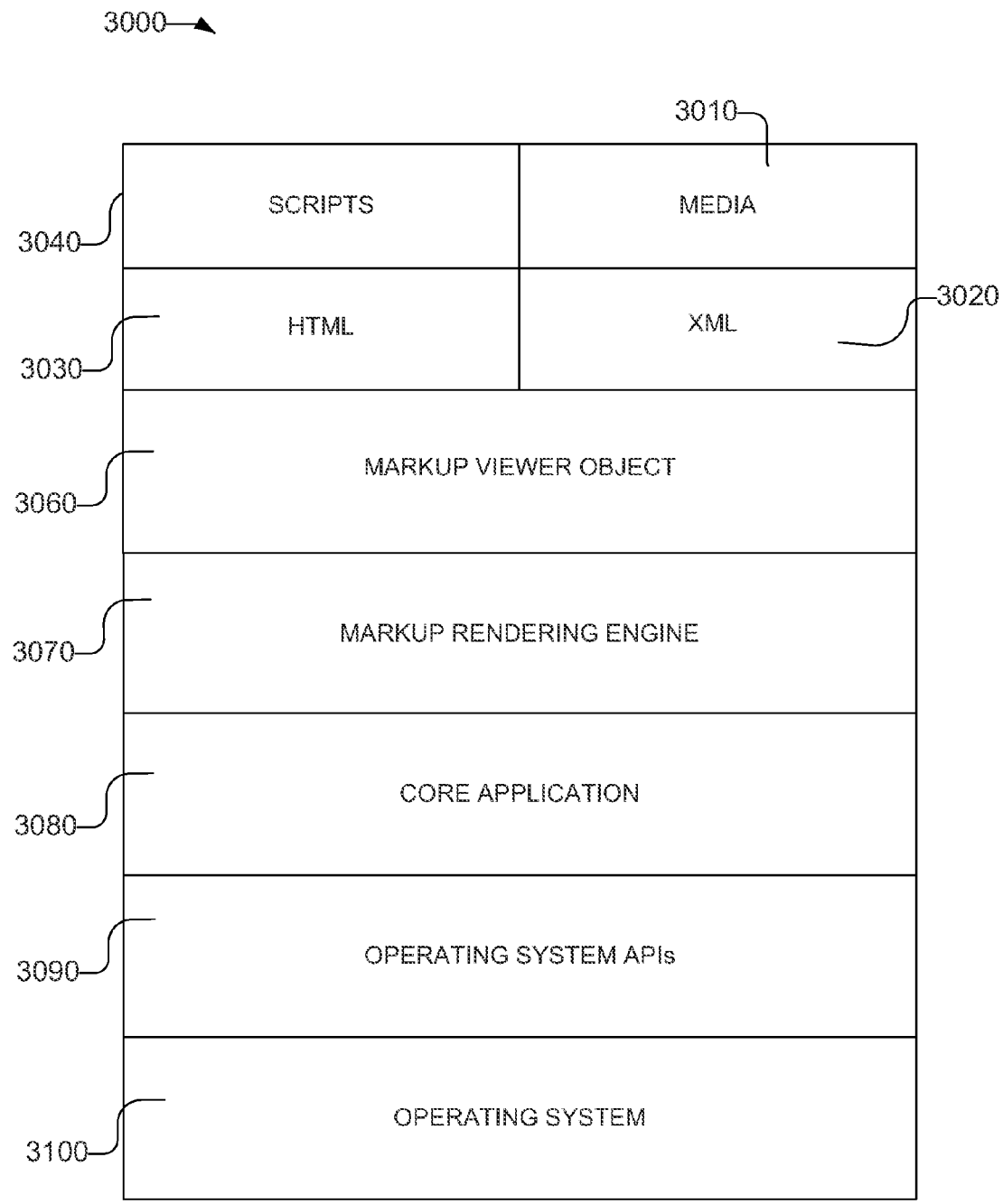
FIG. 3 shows a schematic of an application stack for an application that may display a media outline according to some examples of the present disclosure.

Turning now to FIG. 3, an example client application stack 3000 which may implement one or more of the media outlines is shown. Operating system 3100 may include a set of functions that manage the computer hardware resources of the client device on which the client application stack 3000 executes. Example client devices include any computing device capable of presenting the media outline to a user and displaying or playing the media file. Examples include an IPAD®, IPHONE®, or IPOD®, all developed by Apple Computer, Inc., of Cupertino Calif.; a XOOM® tablet developed by Motorola, Inc., of Schaumberg Ill.; laptop computers, desktop computers, or the like. The operating system 3100 provides various functions and services to upper layers in the application stack 3000 through operating system application programming interfaces (APIs) 3090. Example operating systems include ANDROID® or CHROME®, both developed by GOOGLE, Inc., of Mountain View Calif.; IOS® or MAC OSX®, developed by Apple; LINUX®, developed by an open source effort; and WINDOWS®, developed by Microsoft, Inc., of Redmond Wash., or the like. An API is a particular set of rules and specifications implemented as software that components of the software stack can follow to communicate with each other. For example, an application program can use APIs provided by the operating system to communicate with the audio driver component of the operating system. An API can be created for applications, libraries, operating systems, etc., and may include specifications for routines, data structures, object classes, function calls, and protocols. The OS APIs 3090 may be used by the core application 3080 to receive user input, cause the media outline to be displayed, and for media playback.

Core application 3080 represents the user-level executable which presents the media outline. In some examples, the core application 3080 may present many different types of content. For example, the core application 3080 may be software which presents an electronic book or textbook which may display many different types of content as part of the electronic book or textbook, including one or more media outlines.

The core application 3080 may be responsible for loading, displaying, and updating the media controller, displaying the various media section descriptions, controlling media play, and featuring the appropriate media section descriptions at the appropriate time. Because the core application 3080 may display types of content other than media outlines (e.g., images), each different type of content may be described in part by a first markup file 3020 such as an XML markup file. While markup files are described herein, it will be appreciated by one skilled in the art with the benefit of Applicants' disclosure that any machine-readable file format may be utilized. This first markup file 3020 may inform the core application 3080 that the content to be displayed is a media outline (as opposed to other types of content) and may also contain pointers to the media (e.g., such as a file path or a network address from which the file may be downloaded or streamed) and to a second markup file 3030, such as a Hyper Text Markup Language (HTML) file. The second markup language file 3030 may contain the various media section descriptions and the time codes on which the associated media sections begin. The second markup language file 3030 may also contain links to one or more scripts such as scripts 3040.

Markup rendering engine 3070 may be used by core application 3080 to render the second markup language file 3030 and may be any layout engine capable of being used by an application such as core application 3080 to display web content and implement basic browser features such as following clicked links. An example markup rendering engine is WEBKIT® developed by Apple Computer, Inc., and others. WEBKIT® provides functions for interpreting and rendering markup, and other APIs provided by the operating system use those functions to provide, e.g., markup viewer classes (which when instantiated produce a markup viewer object 3060) to display web content in on-screen windows or locations and which implement basic browser functionality.

The media 3010 may be stored in a media file in any format capable of storing digital audio data on a computer system. Example formats include those defined by the various Moving Picture Experts Group (MPEG) standards such as MPEG-1, MPEG-2, and MPEG-4, Apple Lossless (m4a), Windows Media Audio (wma), and the like. In other examples, the media may be streamed from a streaming server over a network such as the Internet.

The second markup language file 3030 may contain an association of the time codes to the media section descriptions. Scripts 3040, linked from the second markup file 3030 and executed by markup viewer object 3060, may search the second markup language file 3030 for these associations, present the time codes as part of the media outline, and visually associate the time codes with the media section descriptions (e.g., through placement in proximity to the media section descriptions or through arrows between the time codes and the descriptions). In some examples, these associations may utilize special markup tags within the second markup language file 3030. For example, special tags with a time code may bracket the media section description associated with that time code. For example:

"<time_begin=0:22> this is a description of a media section </time_begin>"

In this example, the markup viewer object 3060 may not render the media section descriptions as it may skip over the unrecognized markup. Therefore, the script may pull the description from the tags and cause it to be displayed in the markup viewer object 3060 (as well as presenting the various time codes along with the descriptions). In other examples, the media section description may be associated with the various time codes in other ways. For example, a proximity to a series of time code tags may be used:

"<time_begin=0:22></time_begin>"this is a description of a media section"

In this example, once the script 3040 encounters a time code tag pair ("<time_begin=></>") then the text from that point until the next time code tag pair may be associated with the time code in the time code tag pair. In these examples, the markup viewer object 3060 may still render the media section descriptions as it may ignore the time code tags and render the descriptions normally. One skilled in the art with the benefit of Applicant's disclosure will appreciate that other ways of associating time codes to the media section descriptions are possible. For example, separate files may be used that may associate the media section descriptions with time codes. In other examples, the media itself may have metadata which identifies the various media sections and also may have metadata which associates that media section with a media section description. In yet other examples, the media itself may contain metadata which contains, or links to, the media section descriptions.

Figure 4:
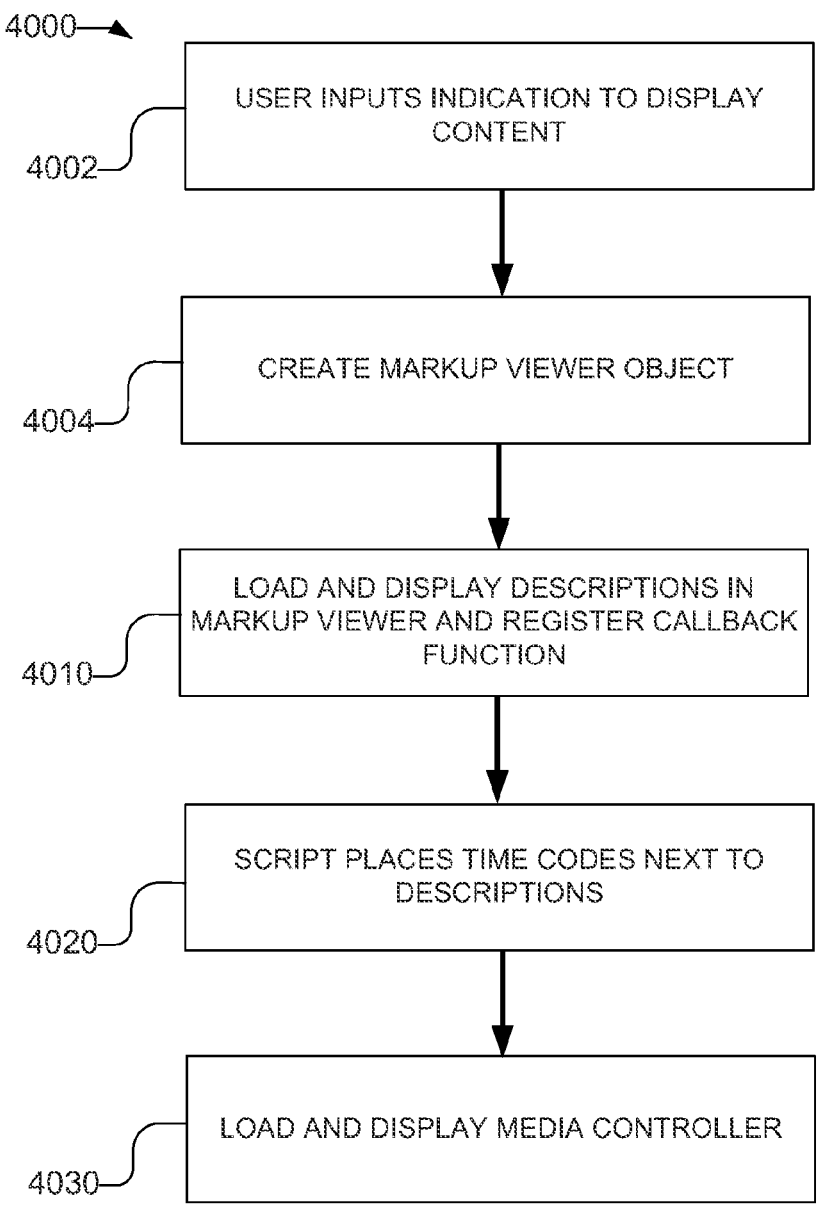
FIG. 4 shows a flowchart of a method of presenting a media outline according to some examples of the present disclosure.

Turning now to FIG. 4 while still referencing the components of FIG. 3, at operation 4002, the core application 3080 may respond to one or more user inputs detected by the operating system 3100 and communicated to core application 3080 through operating system application programming interface (API) 3090. One or more such user inputs include an indication that a user wishes to display certain content represented by first markup file 3020. The first markup file 3020 may include an indicator that the content is a media outline and provide links to the second markup file 3030 and the media 3010. The core application 3080 utilizes the markup rendering engine 3070 to create a markup viewer object 3060 at operation 4004 to load and display the second markup file 3030 containing the media section descriptions at operation 4010. At operation 4010, the core application 3080 also registers a callback function which the markup rendering engine 3070 calls if an attempt is made to navigate away from the second markup file 3030 (e.g., a link is clicked on). As the HTML is rendering, one or more scripts 3040 may be executed based upon instructions in the second markup file 3030. Script(s) 3040 may display the various time codes (e.g., 1120, 1130, and 1140 from FIG. 1) and make them user-selectable at operation 4020. At operation 4030, the core application 3080 may present to the user the media controller (such as media controller 1050 of FIG. 1).

Figure 5:
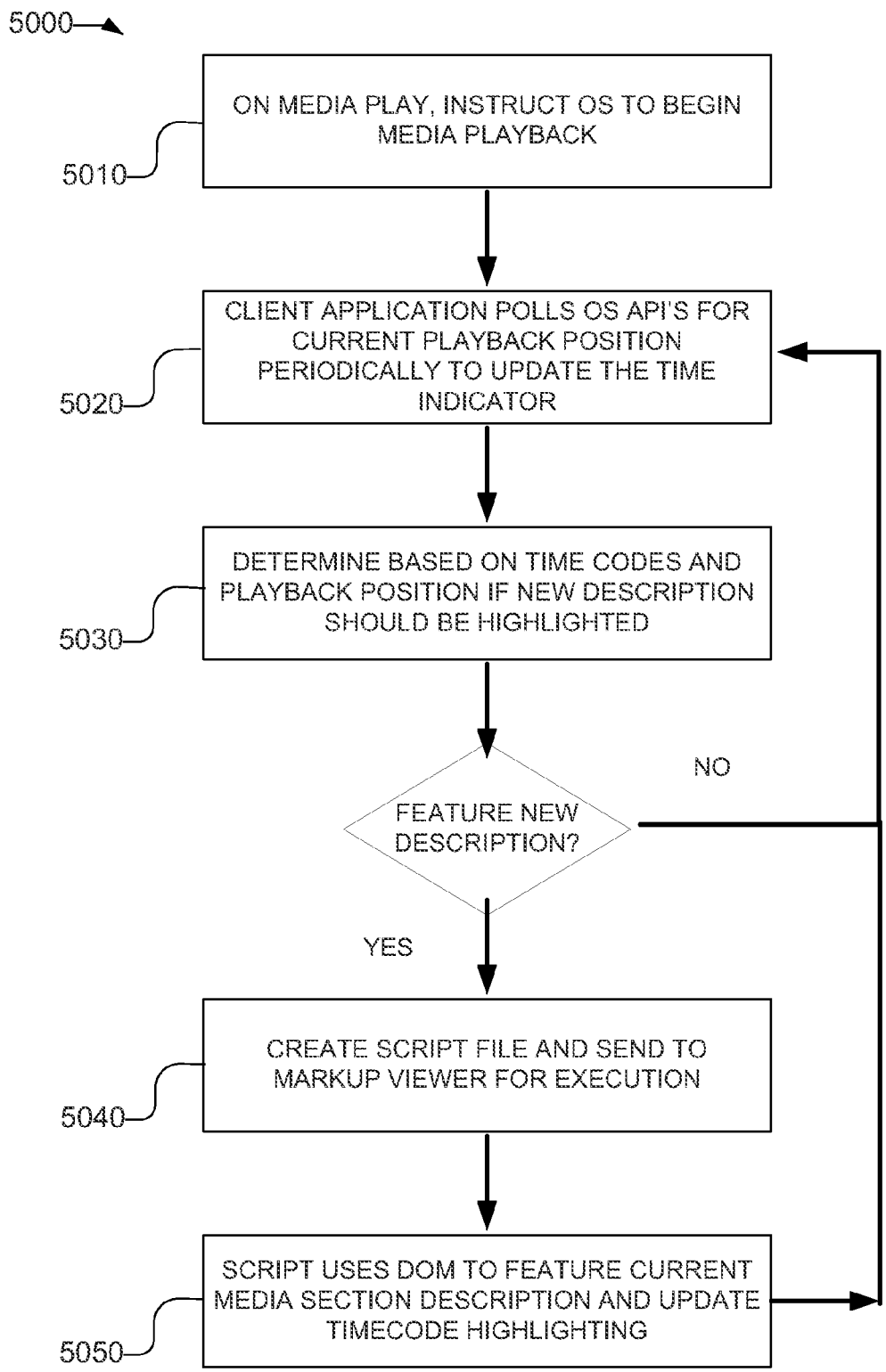
FIG. 5 shows a flowchart of a method of responding to certain user inputs according to some examples of the present disclosure.

Turning now to FIG. 5, a method 5000 of media playback is shown. Upon a user input which starts the media playback (e.g., pressing the play button on the media controller 1050 of FIG. 1), the core application 3080 (FIG. 3) may instruct the operating system 3100 through the OS API 3090 to begin playback of the media 3010 at operation 5010. Through the OS API 3090, the core application 3080 may periodically determine the current playback position in order to update the position of the time indicator 1080 on the time line 1070 (both of FIG. 1) at operation 5020. The core application 3080 may keep a list of all the media sections, the time codes on which they begin, and the current highlighted media section. By comparing the current playback position to the time codes, the client application may determine if a new media section should be highlighted at operation 5030. If a new media section should be featured, the client application may create a script (such as a JavaScript) and cause the script to be executed by the markup viewer object 3060 at operation 5040. The script may utilize the Document Object Model (DOM) to cause the proper media section description to be featured at operation 5050. The script may also update the time code button 1150 (FIG. 1) to indicate the correct, featured, section description. If at operation 5030 it is determined that a new media section should not be featured, the method returns to operation 5020.

Figure 6:
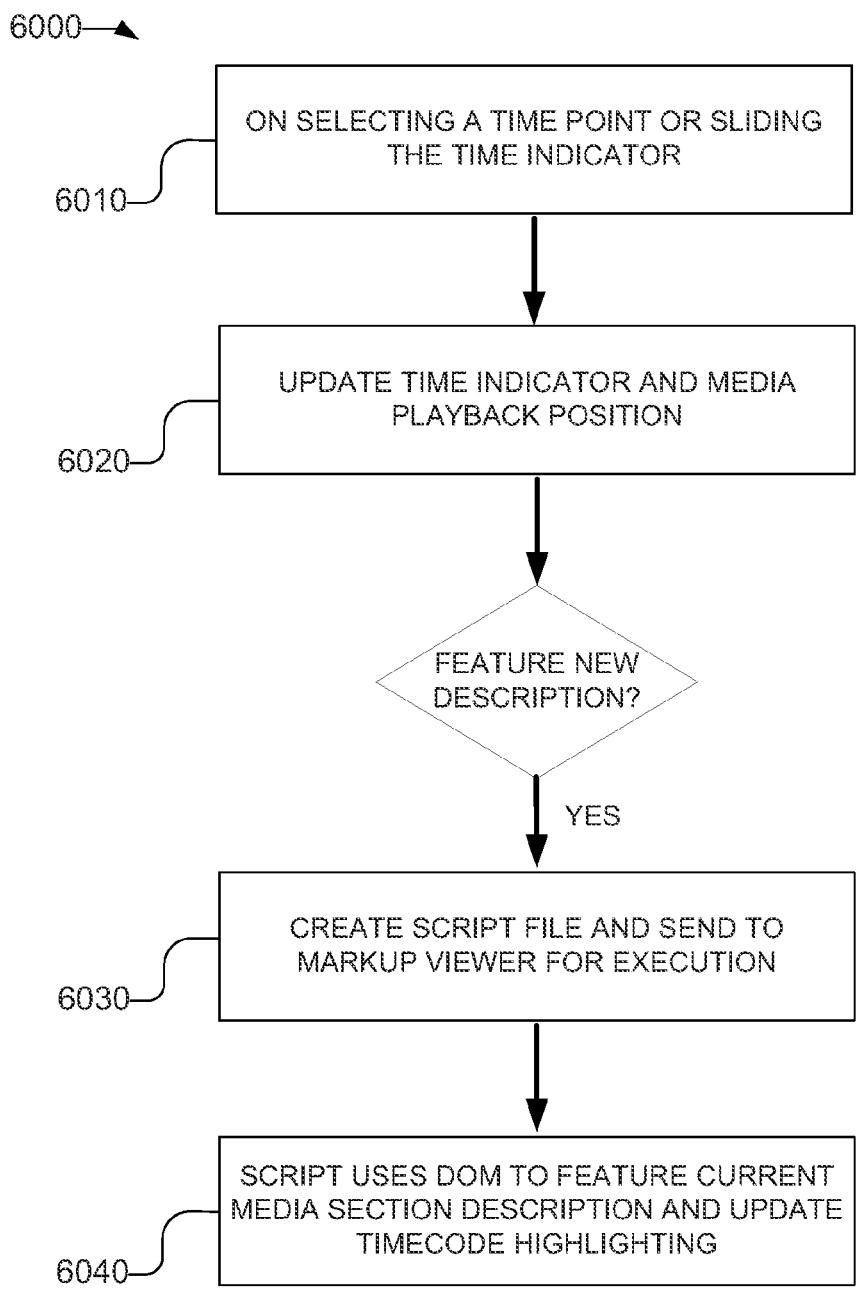
FIG. 6 shows a flowchart of a method of responding to certain user inputs according to some examples of the present disclosure.

Turning now to FIG. 6, a method 6000 of responding to user input on the time line (such as time line 1070 of FIG. 1) according to some examples is shown. At operation 6010, the operating system 3100 (FIG. 3) registers a user input indicating the user has adjusted the time indicator 1080 (FIG. 1) to a new playback time, or selected one of the time points 1100 or 1110 (FIG. 1) on the time line 1070. At operation 6020 the core application 3080 (FIG. 3) updates the time indicator 1080 to a new position on the time line 1070 corresponding to the position the user selected and updates the media playback position using OS API calls. If a new media section description is to be featured based upon the updated playback position of the media file, the client application may then create a script file (e.g., such as a JavaScript file) at operation 6030 and send it to the markup viewer for execution. The script file contains instructions to feature the proper media section description based on the current playback position. At operation 6040 the script uses the DOM to feature the current media section description and to feature the appropriate time code (e.g., such as moving the time code button 1150 of FIG. 1).

Figure 7A:
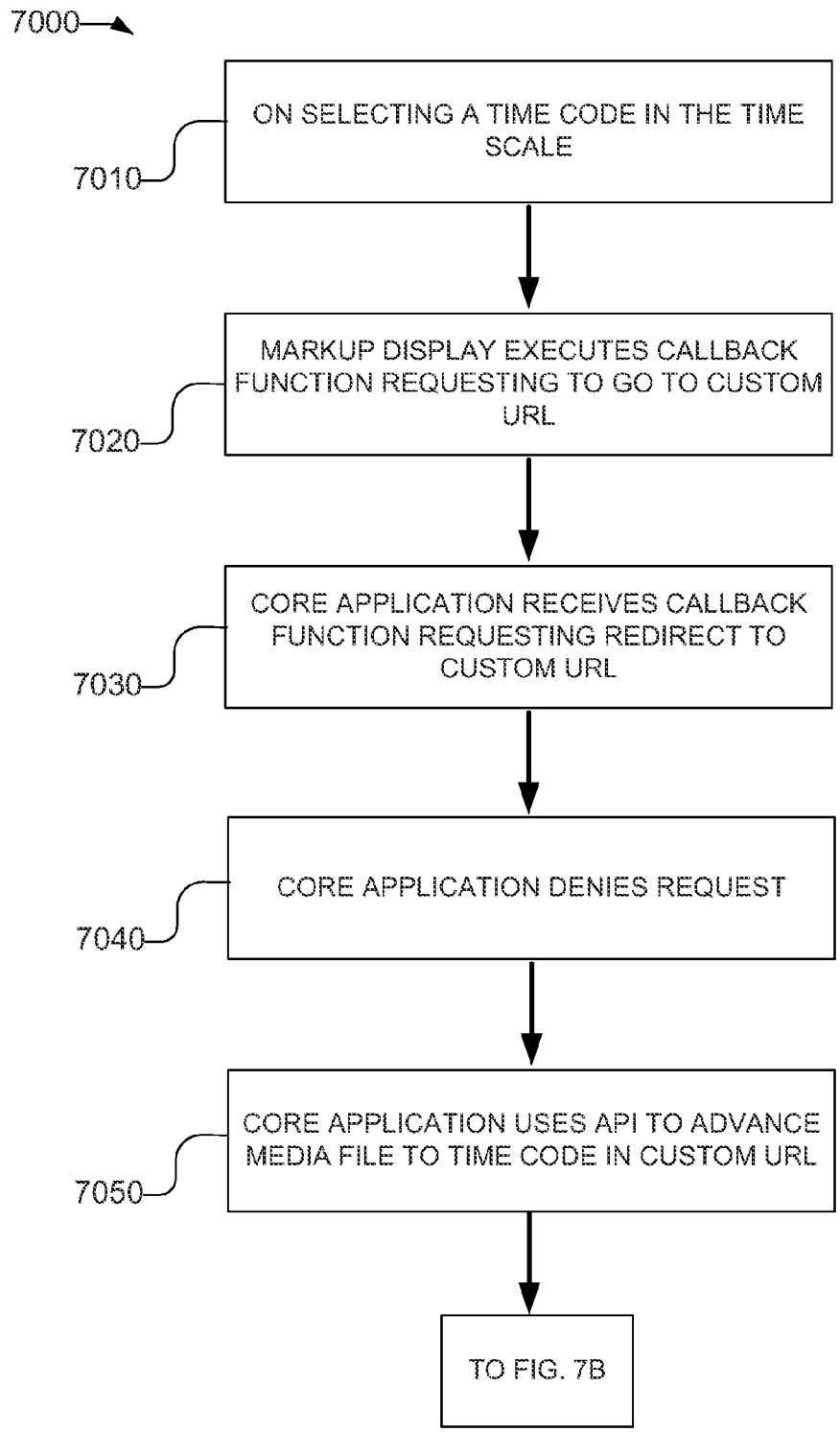
FIG. 7A shows a flowchart of a method of responding to certain user inputs according to some examples of the present disclosure.

Turning now to FIG. 7A, a method 7000 of responding to user input by selecting the time codes associated with the media section descriptions according to some examples is shown. At operation 7010 the user selects a time code or a media section description. In some examples, the time codes displayed in the media section descriptions may be hyperlinks used to provoke the callback function that the client application registered to receive from the markup viewer object 3060 (FIG. 3). The links may not link to real markup pages, but instead the link itself may contain information that is then passed to the core application 3080 through the use of the callback function which informs the core application 3080 that a particular time code was selected. The purpose of the callback function is to give the application that created the markup viewer object 3060 (in this case core application 3080) approval over whether or not the markup viewer object 3060 may change the markup page displayed. The core application 3080 may deny the request (keeping the second markup language file 3030 displayed), and may read the information in the URL of the callback to ascertain which media section description to feature and to update the media playback position through a call to the operating system API 3090 and update the time indicator 1080 on the time line 1070 (of FIG. 1).

At operation 7020 the markup display executes the call to the callback function in the core application 3080. The core application 3080 receives the callback at operation 7030 and denies the request at operation 7040. At operation 7050 the core application 3080 uses the API to request the operating system 3100 advance the media playback to the time code clicked on.

Figure 7B:
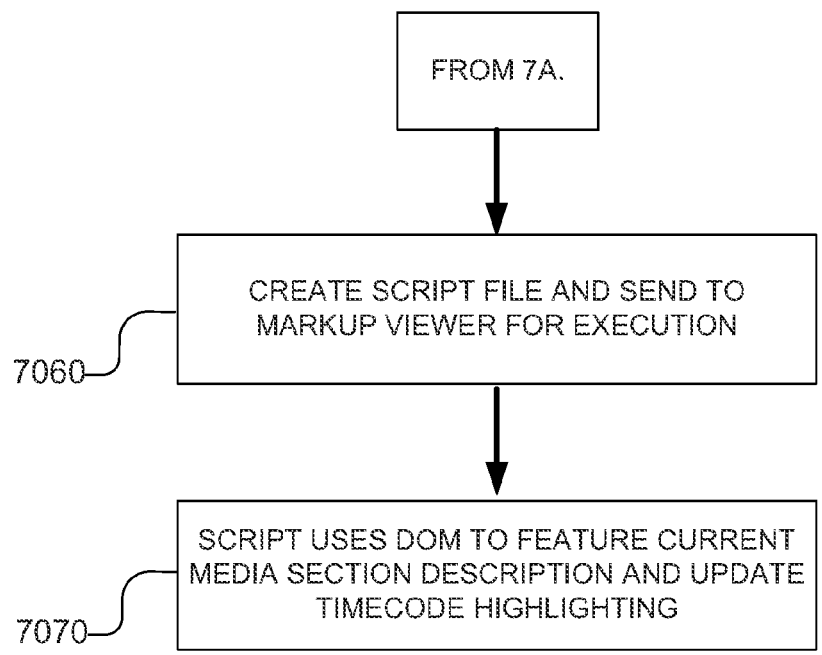
FIG. 7B shows a flowchart of a method of responding to certain user inputs according to some examples of the present disclosure.

Continuing now onto FIG. 7B, the core application 3080 may then create a script at operation 7060 which may be sent to the markup viewer for execution. At operation 7070, the script uses the DOM to feature the current media section description and to update the time code highlighting (e.g., such as moving the time code button 1150).

Note that in some other examples, after clicking on the time code, a script executing in the markup viewer may perform the actions of the script created at operation 7060 such that operations 7060 and 7070 may no longer be necessary.

In some examples, users may interact with the media section descriptions. For example, a user may add notes to a portion of the media section description. Notes may contain text, graphics, links, video, audio, or the like. These notes may be shared with other users or a group of users who may also view the notes when viewing the media outline. Other users may also add comments to the note and start a discussion thread about the media section description. A discussion in some examples may be a series of one or more notes or questions about a particular topic posted by one or more interactive content users, educators, content creators, or other authorized users. A discussion may appear entirely within a single note, as a series of notes, a stack of notes and the like.

Another example interaction is a content highlight. A content user may highlight a portion of the media section description. The highlighted portion may then be shown contrasted against the rest of the media section description. For example, if the content portion is text, the text may be displayed with a yellow background to highlight this text portion. These highlights may be shared with other users or a group of users. Various interactions may be described in greater detail in U.S. patent application Ser. No. 13/213,994 entitled "OBJECT ORIENTED APPLICATIONS" to Charles MacInnis, filed on Aug. 19, 2011 which is hereby incorporated by reference in its entirety. Any such interactions may be integrated within the media outline.

Yet another example interaction may be an indication that another user is viewing the media outline or a particular media section description. A visual indication of presence is described in U.S. patent application Ser. No. 12/731,656 to MacInnis entitled "SYSTEM AND METHODS FOR READING LOCATION AWARENESS" which is hereby incorporated herein in its entirety. The interaction may include showing what media outlines and/or particular media section descriptions other users or other users in a particular group (e.g., class, social network, friends, and the like) in your geolocation or near your geolocation are currently or have been viewing or interacting with.

In some examples, these interactions may be displayed with the media section description when the media section description to which it is associated is visible, but in other examples the interactions may only be displayed when the media section description with which it is associated is displayed.

Creating Media Outlines

Turning now to FIG. 8, an example system 8000 for creating and editing media outlines is shown. The system may include a client side component 8002 and a creation service component 8004. Creation service component 8004 may be accessed by the client side component 8002 over network 8070. Creation service component 8004 may be or include one or more computer servers. Network 8070 may be any means of allowing client and creation service components 8002 and 8004 to communicate and may include a Local Area Network (LAN), a Wide Area Network (WAN), portions of the Internet, or the like. Creation service component 8004 may include an operating system 8100 that may include a set of functions that manage the computer hardware resources 8110 of the creation service component 8004. The operating system 8100 may provide various functions and services to upper layers in the application stack through operating system application programming interfaces (APIs) 8090. The OS APIs 8090 may be used by the web application server 8080 to receive communication from the client side component 8002.

Application server 8080 provides to client side component 8002 a series of markup pages, scripts, and other executable programs comprising an editing application 8045 to the client side component 8002 for execution on the client side. The editing application 8045, when executed by the client side, provide tools for the creation and editing of media outlines. For example, these tools (when executed by the client side component) may provide a WYSIWYG (What You See Is What You Get) editing interface to create and edit the media outlines. A WYSIWYG editor refers to an application in which content (text and graphics) displayed onscreen during editing appears in a form closely corresponding to its appearance when printed or displayed as a finished product. Application server 8080 also provides facilities to store and manage created media outlines. Storage of media outlines may be done through the use of any data storage means (e.g., harddrives, distributed file systems, databases, or the like) such as data store 8075.

Client side component 8002 receives the editing application 8045 over network 8070 in response to a request sent from client side component to access the editing application 8045. Markup rendering engine 8050 utilizes hardware 8065 and client operating system 8060 (through OS APIs 8065) to execute the editing application 8045. For example, the editing application 8045 may include one or more HTML and JavaScript files, which when loaded and rendered by the markup rendering engine 8050 may provide the editing interface to edit the media outlines.

Once the editing application 8045 is executing, the user may specify one or more existing media outlines to edit, or create one or more new media outlines. If an existing media outline is selected, client side component may request the media outline components from server side component 8004, which may send the media outline (comprising the first and second markup language files 8020, 8030, and the media files 8010) to the client side component over network 8070.

Editing application 8045 may consist of a simple form to input desired changes to the media outline, or may consist of a WYSIWYG representation of the media outline with which the user interacts, or the like. For example, the user may select a media description that is visually represented (either as markup or as a rendered portion of a web page) and visually indicate in a WYSIWYG manner that the selected media description should be associated with a desired time code. This time code may be entered directly into the editing application 8045 or it may be selected from a pre-populated list presented by the editing application 8045. Users may also create one or more media descriptions and specify the time codes for each. Once the media description is successfully associated with a time code by the user, the user may choose to save their progress. Any created or updated media section descriptions are formatted as appropriate and saved to the second markup file (or equivalent) 8030 and any time codes may be associated with those descriptions as previously described.

Upon saving a new media outline, or changes to an existing media outline, the client side component 8002 may communicate these changes to the application server 8080 via the network 8070, which processes this information, changes the creation service component's record of the authoring data if appropriate, and communicates information regarding the success or failure back to the editing application 8045. In some examples, the media outline may be explicitly saved by the user, but in other examples, the editing application 8045 may automatically save changes to the media outline from time to time.

While the above examples utilized a web-based editing application 8045 which communicates with creation service component 8004 across a network 8070 to create media outlines, one skilled in the art with the benefit of Applicants' disclosure will appreciate that a non web-based application may be used to create and edit media outlines. Additionally, while the above examples utilized storage at the creation service component 8004, it will also be appreciated by one skilled in the art with the benefit of Applicants' disclosure that local storage on the client might be used instead. Additionally, while the above examples utilized a web-based editing application 8045 which allowed for editing on the client side component 8002 with changes being saved at the creation service component 8004, in some examples, the client application 8045 may exist partially on the creation service component 8004 such that the client application 8045 may convey one or more user inputs across network 8070. These user inputs may be used by the portion of client application 8045 running on the creation service component 8004 which may then give effect to those inputs. For example, a desired change to the media file may be communicated from client application 8045 across network 8070. This desired change may be processed by the creation service component 8004, which may then send an indication of whether the change was accepted or not.

Example Client Device

Figure 9:
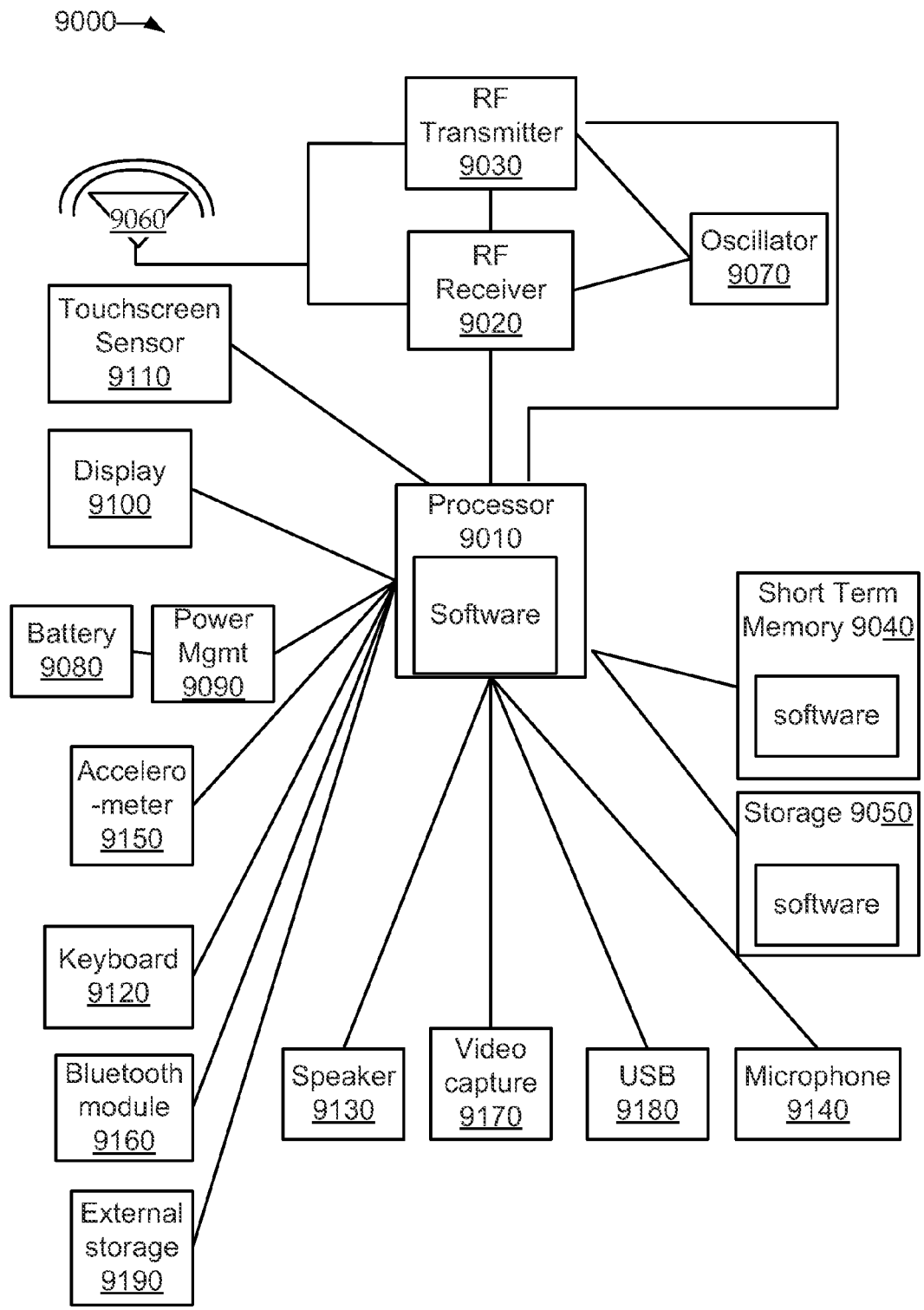
FIG. 9 shows a schematic of an example client device according to some examples of the present disclosure.

The application which displays the media outlines may be executable on various client devices. Client devices may include any electronic device capable of processing, displaying, and updating the media outline. Examples of electronic devices include desktop computers, laptop computers, server computers, cellphones, smart phones, tablet computers, computer game consoles, portable computer gaming consoles, media players, portable media players, other mobile devices, and the like. FIG. 9 shows one example of such a device in the form of an electronic device 9000. Processor 9010 may control the overall functions of the electronic device 9000 such as running applications and controlling peripherals. Processor 9010 may be any type of processor, including Reduced Instruction Set Computing ("RISC"), Complex Instruction Set Computing ("CISC"), Very Long Instruction Word ("VLIW"), Minimal Instruction Set Computer ("MISC"), One Instruction Set Computer ("OISC"), and the like. Processor 9010 may be or include a Digital Signal Processor (DSP). Processor 9010 may communicate with RF receiver 9020 and RF transmitter 9030 to transmit and receive wireless signals such as cellular, Bluetooth, and Wi-Fi signals. Processor 9010 may use short term memory 9040 to store operating instructions and to help in the execution of the operating instructions (e.g., such as the temporary storage of calculations and the like.) Processor 9010 may also use non-transitory storage 9050 to store and read instructions, files, and other data that requires long term, non-volatile storage.

RF receiver 9020 and RF transmitter 9030 may send signals to the antenna 9060. RF transmitter 9030 contains all the necessary functionality for transmitting radio frequency signals via antenna 9060 given a baseband signal sent from processor 9010. RF transmitter 9030 may contain an amplifier to amplify signals before supplying the signal to antenna 9060. RF transmitter 9030 and RF receiver 9020 are capable of transmitting and receiving radio frequency signals of any frequency, including microwave frequency bands (0.3 to 70 GHz), which include cellular telecommunications, WLAN, and WWAN frequencies. Oscillator 9070 may provide a frequency pulse to both RF receiver 9020 and RF transmitter 9030.

Electronic device 9000 may include a battery 9080 or other power source with associated power management process or module 9090. Power management module 9090 distributes power from the battery 9080 to the other various components. Power management module 9090 may also convert the power from battery 9080 to match the needs of the various components. Power may also be derived from alternating or direct current supplied from a power network.

Processor 9010 may communicate and control other peripherals, such as LCD display 9100 with associated touch screen sensor 9110. Processor 9010 causes images to be displayed on LCD display 9100 and receives input from the touch screen sensor 9110 when a user presses on the touchscreen display. In some examples, touch screen sensor 9110 may be a multi-touch sensor capable of distinguishing and processing gestures.

Processor 9010 may receive input from a physical keyboard 9120. In other examples, the electronic device 9000 may utilize a touch screen keyboard using LCD display 9100 and touch screen sensor 9110. Processor 9010 may produce audio output and other alerts that are played on the speaker 9130. Speaker 9130 may also be used to play voices (in the case of a voice phone call) that have been received from RF receiver 9020 and been decoded by processor 9010. Microphone 9140 may be used to transmit a voice for a voice call conversation to processor 9010 for subsequent encoding and transmission using RF transmitter 9030. Microphone 9140 may also be used as an input device for commands using voice processing software. Accelerometer 9150 provides input on the motion of the device 9000 to processor 9010. Accelerometer 9150 may be used in motion-sensitive applications. Bluetooth module 9160 may be used to communicate with Bluetooth-enabled external devices. Video capture device 9170 may be a still or moving picture image capture device or both. Video capture device 9170 is controlled by processor 9010 and may take and store photos and videos, and may be used in conjunction with microphone 9140 to capture audio along with video. USB port 9180 enables external connections to other devices supporting the USB standard and charging capabilities. USB port 9180 may include all the functionality to connect to, and establish a connection with, an external device over USB. External storage module 9190 may include any form of removable physical storage media such as a flash drive, micro SD card, SD card, Memory Stick, and the like. External storage module 9190 may include all the functionality needed to interface with these media.

Modules, Components and Logic

Certain embodiments are described herein as including logic or a number of components, modules, or mechanisms. Modules or components may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors, including processor 8010, may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 10:
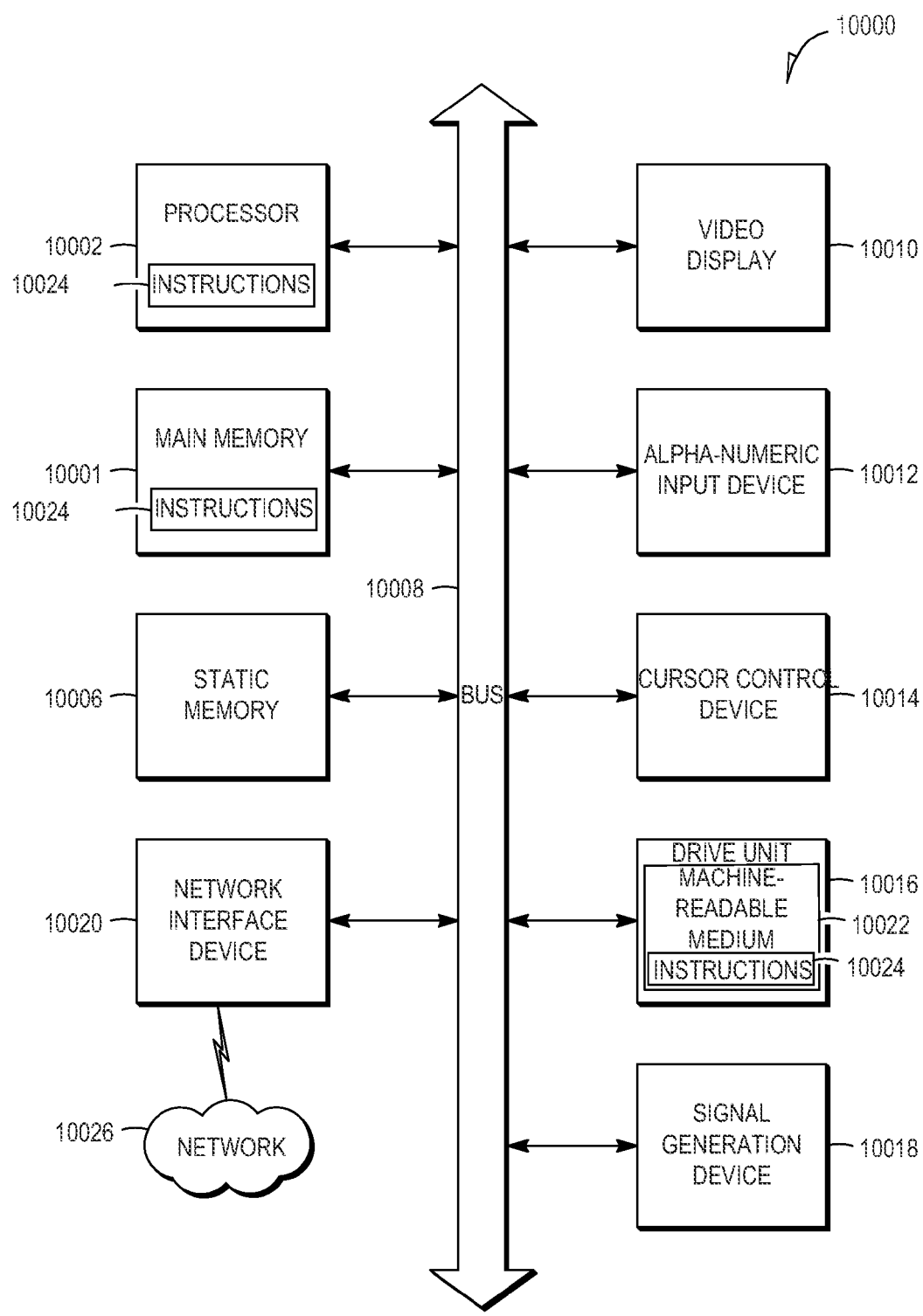
FIG. 10 shows a schematic of a machine implementation, according to some examples of the present disclosure.

FIG. 10 shows a diagrammatic representation of a machine in the example form of a computer system 10000 within which a set of instructions 10024 for causing the machine to perform any one or more of the methods, processes, operations, or methodologies discussed herein may be executed. The machine may be or include parts of the example client device of FIG. 9. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems that are linked (e.g., either by hardwired, wireless, or a combination of hardwired and wireless connections) through a network, both perform tasks. In a distributed system environment, program modules may be located in both local and remote memory-storage devices (see below).

The example computer system 10000 includes a processor 10002 (e.g., a Central Processing Unit (CPU), a Graphics Processing Unit (GPU) or both), a main memory 10001 and a static memory 10006, which communicate with each other via a bus 10008. The computer system 10000 may further include a video display unit 10010 (e.g., a Liquid Crystal Display (LCD) or a Cathode Ray Tube (CRT)). The computer system 10000 also includes an alphanumeric input device 10012 (e.g., a keyboard), a User Interface (UI) controller 10014 (e.g., a mouse), a disk drive unit 10016, a signal generation device 10018 (e.g., a speaker) and a network interface device 10020 (e.g., a transmitter).

The disk drive unit 10016 includes a machine-readable medium 10022 on which is stored one or more sets of instructions 10024 and data structures (e.g., software) embodying or used by any one or more of the methodologies or functions illustrated herein. The instructions 10024 may also reside, completely or at least partially, within the main memory 10001 and/or within the processor 10002 during execution thereof by the computer system 10000, with the main memory 10001 and the processor 10002 also constituting machine-readable media.

The instructions 10024 may further be transmitted or received over a network 10026 via the network interface device 10020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions 10024. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Additional Notes and Examples

Disclosed in some examples is a method for presenting an interactive media presentation, the method includes presenting a plurality of media section descriptions, each media section description comprising a selectable time code and a description; presenting a media controller selectable between a playback state and a non-playback state and including a displayed time line with one or more selectable time points; responsive to a user initiating the playback state, playing a media item and advancing a time indicator along the time line in accordance with a playback position of the media item and featuring the media section description corresponding to the playback position in the media item.

Disclosed in another example is a system for presenting an interactive media presentation, the system including an output module configured for: presenting a plurality of media section descriptions, each media section description comprising a selectable time code and a description; presenting a media controller selectable between a playback state and a non-playback state and including a displayed time line with one or more selectable time points; responsive to a user initiating the playback state, playing a media item and advancing a time indicator along the time line in accordance with a playback position of the media item and featuring the media section description corresponding to the playback position in the media item.

Disclosed in yet another example is a machine-readable medium that stores instructions which when performed by a machine, cause the machine to perform certain operations. In some examples the operations include presenting a plurality of media section descriptions, each media section description comprising a selectable time code and a description; presenting a media controller selectable between a playback state and a non-playback state and including a displayed time line with one or more selectable time points; responsive to a user initiating the playback state, playing a media item and advancing a time indicator along the time line in accordance with a playback position of the media item and featuring the media section description corresponding to the playback position in the media item.

A method of creating a media outline comprising: creating a plurality of media section descriptions and associating each of the plurality of media section descriptions with a time code, each media section description describing a different section of an associated media file, the associated media section starting at the time code.

The method of the previous example, comprising creating the media section descriptions using a web-based editor downloaded from a creation service across a network.

The method of the previous examples, wherein the media section descriptions are associated with the time codes using the web-based editor.

The method of the previous examples, wherein the media outline is stored on a data store across a network.

The method of the previous examples, wherein the media section descriptions and the associations between the media section descriptions are stored in a markup file.

The method of the previous examples, wherein the association between the media section descriptions and the time codes comprises a markup tag.

A system for creating a media outline comprising: an editor interface configured to present a user interface to allow a user to create a plurality of media section descriptions and associate each of the plurality of media section descriptions with a time code, each media section description describing a different section of an associated media file, the associated media section starting at the time code.

The system of the previous example, wherein the editor interface is downloaded from a creation service across a network.

The system of the previous examples, wherein the media outline is stored on a data store across a network.

The system of the previous examples, wherein the media section descriptions and the associations between the media section descriptions are stored in a markup file.

The system of the previous examples, wherein the association between the media section descriptions and the time codes comprises a markup tag.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first,"

"second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments of the invention should be determined with reference to the appended claims, along with the full scope of equivalents to which such claims are entitled.

What is claimed is:

1. A method for presenting an interactive media presentation, the method comprising:
    presenting a plurality of media section descriptions, each media section description comprising a selectable time code and a description;
    presenting a media controller selectable between a playback state and a non-playback state and including a displayed time line with one or more selectable time points;
    responsive to a user initiating the playback state, (i) playing a media item, (ii) advancing a time indicator along the time line in accordance with a playback position of the media item, and (iii) featuring a first media section description of the plurality of media section descriptions, the first media section description corresponding to the playback position in the media item; and
    responsive to a user navigation input concerning a second media section description of the plurality of media section descriptions, (i) executing a call to a callback function, (ii) denying a request for a uniform resource locator (URL) associated with the callback function and featuring the second media section description indicated by said user navigation input, (iii) playing a portion of the media item corresponding to the second media section description indicated by said user navigation input, and (iv) adjusting the time indicator along the timeline to a time corresponding to a time code indicated by the callback function.

2. The method of claim 1, wherein the media section descriptions include a musical notation.

3. The method of claim 1, wherein the media section descriptions include lyrics.

4. The method of claim 1, wherein featuring the first media section description includes positioning the media section description at a particular on-screen location.

5. The method of claim 1, wherein featuring the first media section description includes featuring a first selectable time code.

6. A system for presenting an interactive media presentation, the system comprising:
    an input module configured for receiving user navigation inputs; and
    an output module configured for:
        presenting a plurality of media section descriptions, each media section description comprising a selectable time code and a description;
        presenting a media controller selectable between a playback state and a non-playback state and including a displayed time line with one or more selectable time points;
        responsive to a user initiating the playback state, (i) playing a media item, (ii) advancing a time indicator along the time line in accordance with a playback position of the media item, and (iii) featuring a first media section description corresponding to the playback position in the media item;
    responsive to a user navigation input concerning a second media section description of the plurality of media section descriptions, (i) executing a call to a callback function, (ii) denying a request for a uniform resource locator (URL) associated with the callback function and featuring the second media section description indicated by said user navigation input, (iii) playing a portion of the media item corresponding to the second media section description indicated by said user navigation input, and (iv) adjusting the time indicator along the timeline to a time corresponding to a time code indicated by the callback function.

7. The system of claim 6, wherein the media section descriptions include a musical notation.

8. The system of claim 6, wherein the media section descriptions include lyrics.

9. The system of claim 6, wherein highlighting the first media section description includes positioning the media section description at a particular on-screen location.

10. The system of claim 6, wherein featuring the media section description includes featuring a first selectable time code.

11. A non-transitory machine-readable medium that stores instructions which when performed by a machine, cause the machine to perform operations comprising:
    presenting a plurality of media section descriptions, each media section description comprising a selectable time code and a description;
    presenting a media controller selectable between a playback state and a non-playback state and including a displayed time line with one or more selectable time points;

responsive to a user initiating the playback state, (i) playing a media item, (ii) advancing a time indicator along the time line in accordance with a playback position of the media item, and (iii) featuring a first media section description corresponding to the playback position in the media item; and responsive to a user navigation input concerning a second media section description of the plurality of media section descriptions, (i) executing a call to a callback function, (ii) denying a request for a uniform resource locator (URL) associated with the callback function and featuring the second media section description indicated by said user navigation input, (iii) playing a portion of the media item corresponding to the second media section description indicated by said user navigation input, and (iv) adjusting the time indicator along the timeline to a time corresponding to a time code indicated by the callback function.

12. The non-transitory machine-readable medium of claim 11, wherein the media section descriptions include a musical notation.

13. The non-transitory machine-readable medium of claim 11, wherein the media section descriptions include lyrics.

14. The non-transitory machine-readable medium of claim 11, wherein the instructions for featuring the media section description include instructions which when executed by the machine, cause the machine to perform the operations of: positioning the first media section description at a particular on-screen location.

\* \* \* \* \*